(12) United States Patent
Durante et al.

(10) Patent No.: US 12,503,408 B2
(45) Date of Patent: Dec. 23, 2025

(54) METHOD OF DISPERSING ANATASE TITANIUM DIOXIDE FOR PENETRATION IN CONCRETE STRUCTURES TO REDUCE POLLUTANTS

(71) Applicant: Pavement Technology, Inc., Westlake, OH (US)

(72) Inventors: Colin Durante, Mansfield, OH (US); Craig Higgins, San Diego, CA (US)

(73) Assignee: Pavement Technology, Inc., Westlake, OH (US)

( * ) Notice: Subject to any disclaimer, the term of this patent is extended or adjusted under 35 U.S.C. 154(b) by 170 days.

(21) Appl. No.: 18/175,581

(22) Filed: Feb. 28, 2023

(65) Prior Publication Data
US 2023/0202938 A1 Jun. 29, 2023

Related U.S. Application Data

(60) Continuation of application No. 16/564,579, filed on Sep. 9, 2019, now Pat. No. 11,667,583, which is a
(Continued)

(51) Int. Cl.
| | |
|---|---|
| C04B 41/00 | (2006.01) |
| B01D 53/94 | (2006.01) |
| B01J 21/06 | (2006.01) |
| B01J 35/39 | (2024.01) |
| B01J 35/45 | (2024.01) |

(Continued)

(52) U.S. Cl.
CPC ...... *C04B 41/5072* (2013.01); *B01D 53/9413* (2013.01); *B01J 21/063* (2013.01); *B01J 35/39* (2024.01); *B01J 35/45* (2024.01); *B01J 37/0215* (2013.01); *C04B 41/009* (2013.01); *C04B 41/5041* (2013.01); *C04B 41/65* (2013.01);
(Continued)

(58) Field of Classification Search
None
See application file for complete search history.

(56) References Cited

U.S. PATENT DOCUMENTS

| 4,153,743 A | 5/1979 | Caramanian |
| 4,817,870 A | 4/1989 | Dalton |

(Continued)

FOREIGN PATENT DOCUMENTS

CA 2836195 A1 3/2006

OTHER PUBLICATIONS

Non Final Office Action dated Nov. 15, 2017 in connection with U.S. Appl. No. 15/290,305.
(Continued)

*Primary Examiner* — Stefanie J Cohen
(74) *Attorney, Agent, or Firm* — Eschweiler & Potashnik, LLC

(57) ABSTRACT

Methods for embedding photocatalytic titanium dioxide in concrete surfaces to reduce pollutants via photocatalytic reactions are provided herein. One method includes mixing a solvent compound with an anatase titanium dioxide ($TiO_2$) photocatalyst, applying an amount of concrete treatment compound to an upper surface of the concrete, the concrete treatment compound comprising a mixture of a liquid carrier compound with the anatase titanium dioxide ($TiO_2$) photocatalyst.

14 Claims, 3 Drawing Sheets

Related U.S. Application Data division of application No. 15/290,305, filed on Oct. 11, 2016, now Pat. No. 10,407,351, which is a continuation-in-part of application No. 14/207,341, filed on Mar. 12, 2014, now Pat. No. 9,493,378.

(60) Provisional application No. 61/780,626, filed on Mar. 13, 2013.

(51) Int. Cl.
| | |
|---|---|
| *B01J 37/02* | (2006.01) |
| *C04B 41/50* | (2006.01) |
| *C04B 41/65* | (2006.01) |
| *C04B 111/00* | (2006.01) |

(52) U.S. Cl.
CPC ............... *B01D 2255/20707* (2013.01); *C04B 2111/00827* (2013.01)

(56) References Cited

U.S. PATENT DOCUMENTS

| | | | |
|---|---|---|---|
| 5,124,182 A | 6/1992 | Kubo | |
| 5,174,877 A * | 12/1992 | Cooper | B01J 19/122 |
| | | | 204/157.4 |
| 5,374,705 A | 12/1994 | Laycock | |
| 5,376,705 A | 12/1994 | Leys | |
| 5,560,773 A | 10/1996 | Gimvang | |
| 5,861,205 A | 1/1999 | Murata | |
| 6,454,489 B1 | 9/2002 | Murata | |
| 6,699,577 B2 | 3/2004 | Nonoyama | |
| 6,824,826 B1 | 11/2004 | Amadelli | |
| 6,919,104 B2 * | 7/2005 | Marzolin | B05D 5/00 |
| | | | 427/427 |
| 7,521,039 B2 | 4/2009 | Bygott | |
| 7,534,754 B2 | 5/2009 | Netherton | |
| 9,493,378 B2 | 11/2016 | Durante | |
| 2007/0155622 A1 | 7/2007 | Goodwin | |
| 2008/0003367 A1 | 1/2008 | Stralton | |
| 2009/0142604 A1 | 6/2009 | Imai | |
| 2013/0266370 A1 * | 10/2013 | Gunther | E01C 19/4866 |
| | | | 404/75 |
| 2014/0272123 A1 | 9/2014 | Durante | |

OTHER PUBLICATIONS

Final Office Action dated Mar. 21, 2018 in connection with U.S. Appl. No. 15/290,305.
Non Final Office Action dated Jul. 3, 2018 in connection with U.S. Appl. No. 15/290,305.
Final Office Action dated Jan. 10, 2019 in connection with U.S. Appl. No. 15/290,305.
Non Final Office Action dated May 9, 2019 in connection with U.S. Appl. No. 15/290,305.
Notice of Allowance dated Jun. 19, 2019 in connection with U.S. Appl. No. 15/290,305.
Non Final Office Action dated Aug. 7, 2015 in connection with U.S. Appl. No. 14/207,341.
Final Office Action dated Dec. 18, 2015 in connection with U.S. Appl. No. 14/207,341.
Non Final Office Action dated Apr. 25, 2016 in connection with U.S. Appl. No. 14/207,341.
Final Office Action dated Aug. 2, 2016 in connection with U.S. Appl. No. 14/207,341.
Notice of Allowance dated Aug. 22, 2016 in connection with U.S. Appl. No. 14/207,341.
Hassan, Marwa M. et al.; "Effect of Application Methods on the Effectiveness of Titanium Dioxide as a Photocatalyst Compound to Concrete Pavement"; Paper No. 10-0746; Transportation Research Board; Washington, D.C.; Jan. 11-15, 2010.
Osborn, David James; "Quantification of NOx Reduction via nitrate accumulation on a TiO2 photocatalytic concrete pavement"; LSU Digital Commons, 2012.
Osborn, David et al.; "Durability Quantification of TiO2 Surface Coating on Concrete and Asphalt Pavements"; Journal of Materials in Civil Engineering; Feb. 2014; pp. 331-337.
Non Final Office Action dated Jun. 13, 2022 in connection with U.S. Appl. No. 16/564,579.
Final Office Action dated Sep. 27, 2022 in connection with U.S. Appl. No. 16/564,579.
Notice of Allowance dated Feb. 7, 2023 in connection with U.S. Appl. No. 16/564,579.
Watts et al, Photocatalysis of 4-chlorophenol mediated by TiO2 fixed to concrete surfaces, Solar Energy 82, pp. 206-211 (Year: 2006).

* cited by examiner

METHOD OF DISPERSING ANATASE TITANIUM DIOXIDE FOR PENETRATION IN CONCRETE STRUCTURES TO REDUCE POLLUTANTS

CROSS-REFERENCE TO RELATED APPLICATIONS

This patent application is a continuation of U.S. patent application Ser. No. 16/564,579 filed on Sep. 9, 2019 now U.S. Pat. No. 11,675,583 issued on Jun. 6''', 2023, which is a divisional of U.S. patent application Ser. No. 15/290,305 filed on Oct. 11, 2016 (now U.S. Pat. No. 10,407,351 issued on Sep. 10, 2019), which is a continuation-in-part of U.S. patent application Ser. No. 14/207,341 filed on Mar. 12, 2014 (now U.S. Pat. No. 9,493,378 issued on Nov. 15, 2016), which in turn claims the priority benefit of U.S. provisional application No. 61/780,626 filed on Mar. 13, 2013, the disclosures of which are incorporated by reference herein in their entirety.

FIELD OF THE INVENTION

The present invention relates primarily to concrete road construction, although it can apply to any horizontal or vertical concrete structures. It is a method of impregnating the concrete with a photocatalytic titanium dioxide catalyst that reacts with nitrogen oxides and other pollutants to chemically alter them into non-hazardous or less hazardous materials through photocatalytic oxidation (PCO) and/or reduction reaction. One or more solvent compounds are used to disperse the anatase form of titanium dioxide so that the photocatalytic titanium dioxide catalyst can penetrate the concrete. The solvent(s) utilized may be organic or inorganic.

SUMMARY

In some embodiments, the present technology is directed to a method that includes applying an amount of concrete treatment compound to an upper surface of the concrete, the concrete treatment compound comprising a mixture of a liquid carrier compound with a titanium dioxide ($TiO_2$) photocatalyst. One or more organic or inorganic solvent compounds are used to disperse the anatase form of $TiO_2$ so that the concrete treatment compound can penetrate the concrete.

In some embodiments, the present technology is directed to a method that includes applying a photocatalytic compound to concrete, wherein the photocatalytic compound is capable of uniformly penetrating the concrete down to a depth of at least an eighth of an inch relative to an upper surface of the concrete. The penetration is due, at least in part, to the solvent compounds used to disperse the anatase form of $TiO_2$ in the photocatalytic compound. In other embodiments, the penetration may be less than an eighth of an inch.

In some embodiments, the present technology is directed to a concrete treatment compound comprising an amount of a carrier liquid mixed with an amount of a photocatalyst, wherein the carrier liquid is capable of penetrating concrete down to a depth of at least an eighth of an inch relative to an upper surface of the concrete. In other embodiments, the penetration may be less than an eighth of an inch.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that are included in the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
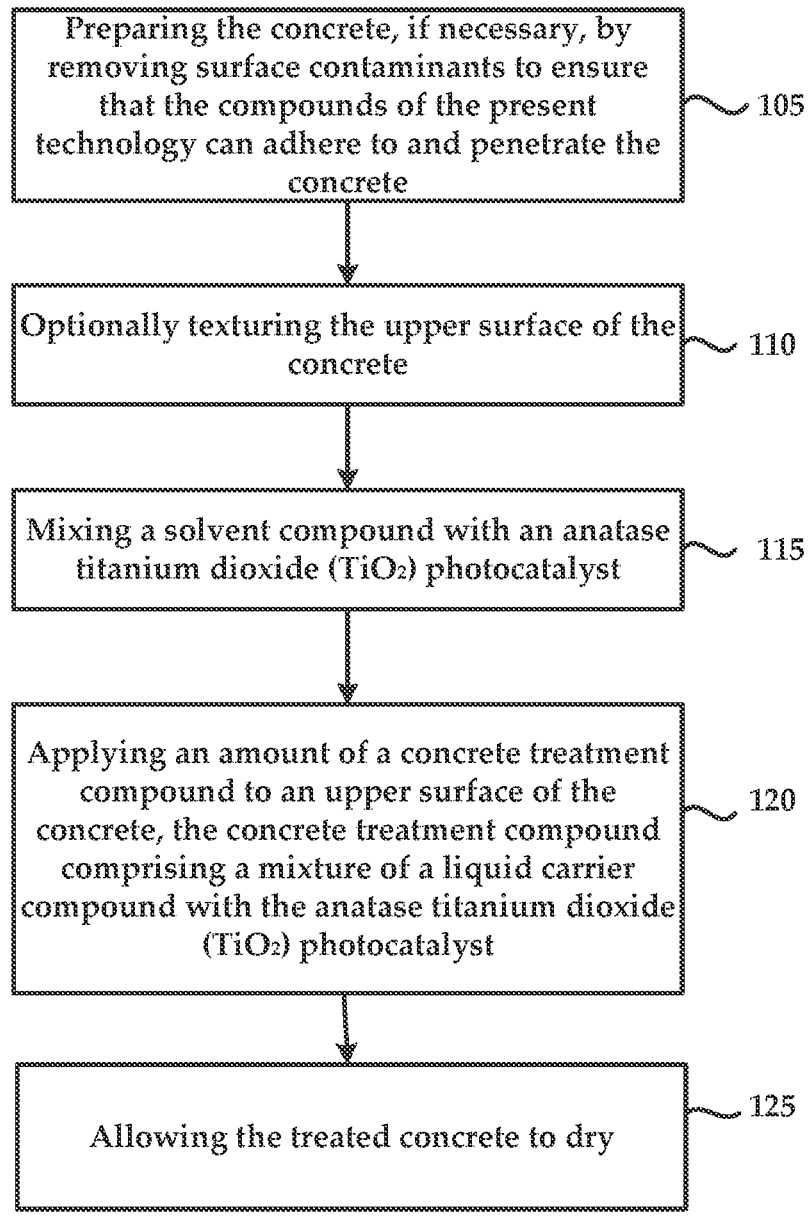
FIG. 1 is a flowchart of an exemplary method of treating concrete to reduce the production of nitrogen oxides (NOx), volatile organic compounds (VOC), and other pollutants by the concrete.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a," "an," and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present technology is embodied in some instances as a method of embedding photocatalytic $TiO_2$ nanoparticles into horizontal and vertical concrete structures that are either already in place or in the process of curing. It is envisioned that the process may be used for all concrete structures, but particularly those in close proximity to roads and highways. The introduction of $TiO_2$ is by impregnation into concrete structures using specialized multi-purpose concrete curing and preservation products, hereinafter referred to as a "concrete treatment compound."

An advantage of the present technology is that it provides a method of dispersing anatase $TiO_2$ with one or more organic or inorganic solvent compounds so that the concrete treatment compound can penetrate into concrete, without the need for the concrete treatment compound to comply with either federal or national regulations regarding volatile organic compounds (VOCs). The concrete treatment compound can be created on the construction site or the job site where the concrete pavement being treated is located. This can be done by mixing the anatase TiO$_2$ with one or more solvent compounds on site.

Another advantage of the present technology is that it provides a method of introducing photocatalytic oxidation technology into existing concrete structures, without the prohibitive cost and disruption of removing said structures and replacing them with new concrete.

Another advantage of the present technology is that it provides a method of economically introducing photocatalytic oxidation technology into just the upper layers of freshly placed concrete, eliminating the prohibitive cost of mixing expensive titanium dioxide into the entire concrete mix.

Another advantage of the present technology is that the concrete treatment compounds uniformly impregnates the concrete at depths great enough that normal wear of the upper surfaces will expose underlying photocatalytic reactive layers to the surface, so that the pollution-reducing capability is self-regenerated (e.g., remains consistent or viable) throughout the lifespan of the concrete structure.

Another advantage of the present technology is that the concrete treatment compounds simultaneously seals and hardens the concrete and fills voids in its structure to increase resistance to water damage, chloride ion penetration, de-icing salts, and freeze/thaw damage. Sealing of the concrete may also improve long-term photocatalytic performance. Indeed, residual salt and water build-up on traditional concrete structures can interfere with photocatalytic oxidation. These protective effects are provided by a liquid carrier compound, into which the TiO$_2$ is mixed.

The present technology contemplates a method of embedding photocatalytic TiO$_2$ nanoparticles, via delivery using concrete treatment compounds, into horizontal and/or vertical concrete structures that are either already in place or in the process of curing. It is envisioned that the process may be used for all concrete structures, but particularly roads and highways and structures in nearby proximity to them.

The introduction of TiO$_2$ is by impregnation into concrete structures using specialized concrete treatment compounds, resulting in the creation of a photocatalytic reactive layer at the surface of the structure and a uniform distribution of TiO$_2$ nanoparticles in the upper layers of the concrete to depths as great as one half (0.5) inches. In some embodiments, the impregnation or embedding of the nanoparticles is uniform and extends to a depth of from approximately one eighth of an inch to approximately one quarter of an inch relative to an upper surface of the concrete. The impregnation or embedding is due, at least in part, to the dispersion of the anatase form of TiO2 by one or more organic or inorganic solvent compounds.

For context, TiO$_2$ is an inorganic pigment and semiconductor material. TiO2 is available in an anatase form, in which the TiO$_2$ is composed of small, isolated, and sharply developed crystals. Anatase TiO$_2$ needs to be dispersed in order for it to penetrate concrete, and can be dispersed with both a water base and solvent base carrier. Manufacturing and shipping solvent base products, for the most part, do not comply with current federal and state regulations with regard to VOCs. As such, anatase TiO2 can be mixed with organic solvents on the construction site or job site where the concrete pavement to be treated is located. Examples of organic solvent compounds include tetrachloroethylene, toluene, turpentine, acetone, methyl acetate, ethyl acetate, hexane, citrus terpenes, ethanol, methyl ethyl ketone, mineral spirits, and ethyl alcohol. Other organic solvent compounds may also be used.

When exposed to ultraviolet (UV) radiation, as from sunlight, TiO$_2$ expels an electron from the valence band to the conduction band, leaving behind a positively charged hole. In the presence of water, as in atmospheric humidity, these positively charged holes create hydroxyl radicals as shown:

$$OH^- + h+ \rightarrow {}^*OH.$$

The hydroxyl radicals in turn oxidize nitrogen oxides as follows:

$$NO + {}^*OH \rightarrow NO_2 + H^+$$

$$NO_2 + {}^*OH \rightarrow NO_3^- + H^+.$$

Other reduction effects occur with volatile organic compounds (VOC) and some other pollutants. Since TiO$_2$ functions as a catalyst and is not consumed in the reaction, the photocatalytic effect continues. If the TiO$_2$ is in place at the surface of concrete, it removes a significant quantity of NOx and VOCs from the environment nearest their source. If TiO$_2$ is uniformly impregnated into the concrete to a given depth the pollution-reducing capability of the concrete will automatically and continuously self-regenerate as the surface layers are subjected to the normal wear of traffic and other environmental factors.

Other reduction effect occurs with volatile organic compounds (VOC) and some other pollutants. Since the TiO$_2$ functions as a catalyst and is not consumed in the reaction, the photocatalytic effect can continue. If the TiO$_2$ is in place at the surface of a concrete roadway or other concrete structure in close proximity to the roadway, it removes a significant quantity of NOx and VOCs from the environment near their source. If TiO$_2$ is uniformly impregnated into the concrete at depth using a liquid carrier compound, the pollution-reducing capability of the concrete will automatically and continuously self-regenerate as the surface layers are subjected to the normal wear of traffic and other environmental factors.

Traditional methods of NOx reduction (e.g., catalytic converter reduction of motor vehicle emissions) have reached a point of diminishing returns in terms of cost effectiveness, resulting in the need for new and innovative methods of pollutant reduction. A method of reducing these pollutants may be the use of photocatalytic titanium dioxide blended into concrete paving mixtures at the time of construction. This method has not seen widespread acceptance or practical implementation yet for a number of reasons.

One key disadvantage of the method described above is its limitation to usage in freshly placed concrete surfaces, reducing its economic viability for existing roadbeds that are structurally sound, which comprise a large percentage of the roadbeds and structures that would be most subject to violating the forthcoming Environmental Protection Agency (EPA) guidelines. The tremendous cost that would be created by replacing these roadbeds and structures with new concrete would be prohibitive, both in terms of dollar cost and user delays.

The present technology impregnates the concrete with TiO$_2$ by applying specialized proprietary penetrating liquid carriers to the surface of a concrete structure. These carriers are designed and proven to carry chemicals into concrete. The TiO$_2$ is blended into the liquid carriers at a proportion that will result in a uniform distribution of TiO$_2$ nanoparticles throughout the upper one-quarter (0.25) inch layer of the concrete structure, or to other depths according to road or structure design requirements. As mentioned above, the combination of liquid carrier compound and TiO$_2$ is referred to as a concrete treatment compound.

Examples of liquid carrier compounds that may be used for this purpose are Litho1000Ti (for existing, cured concrete) manufactured by Pavement Technology, Inc. and Lithium Cure Ti (for new concrete that is in the curing process) manufactured by Sinak Corporation.

These carrier compounds have the added benefit of sealing and hardening the concrete and filling voids in its structure to increase resistance to water damage, chloride ion penetration, de-icing salts, and freeze/thaw damage. In some embodiments, an anatase powder form of TiO$_2$ nanoparticles at a specific concentration is combined with the liquid carrier that will result in TiO$_2$ being delivered at the designed rate of application for the impregnated region. To be sure, other penetrating liquid carriers and/or forms of TiO$_2$, other semiconductors or inorganic pigments that are photocatalytic and alternate concentration levels, can be employed as deemed suitable.

In some embodiments the concrete treatment compound comprising the TiO$_2$ additive (or other photocatalytic compound) is sprayed or otherwise applied to horizontal road surfaces by a sprayer applicator with a spray bar of variable length utilizing industry standard nozzles. The application rate is controlled by a computerized flow manager, which allows the carrier compound to be precisely applied to the road surface. Once the flow rate computer has been set to the desired application rate, the application of the carrier compound is very accurate due to the computer control of the flow, regardless of travel speed variations of the sprayer. On vertical surfaces, or other surfaces inaccessible to a sprayer applicator with spray bar, the compound can be applied by hand spraying with a wand, or any other suitable means of application that maintains the required accuracy.

If conditions in a given application dictate that a horizontal concrete surface requires texturing for safety, adhesion or other reasons, abrasive media application methods will be employed prior to spray application of the liquid carrier compounds. Exemplary methods are the Skidabrader process, conventional shot blasting, diamond grinding, water blasting, and the like.

In some embodiments, if the concrete surface is damaged or the surface has an unacceptable slip coefficient (e.g., a surface texture that is likely to cause an individual to slip and fall on the surface) the surface to be treated may be textured using the aforementioned abrasive process, or repaired if necessary.

Additionally, the concrete treatment compounds of the present technology can be applied to a concrete surface without first priming the surface, which is often required for concrete treatment processes such as painting or sealing.

As mentioned above, the amount concrete treatment compound (e.g., carrier compound plus photocatalytic material) that is applied to a concrete surface should be enough to penetrate the concrete down to between a depth range of approximately an eighth of an inch to approximately a half of an inch, inclusive. Further, a concentration of photocatalytic material within the liquid carrier compound should be sufficient to achieve a desired concentration of the photocatalytic material within the concrete surface. This process of delivering concrete treatment compounds is referred to as distributive embedding.

The depth to which the concrete treatment compound should be distributively embedded may depend upon a variety of factors such as the composition and size of the aggregate used to create the concrete or the binder used to hold the aggregate together. By example, the photocatalytic material of the concrete treatment compounds may only need to penetrate up to one quarter of an inch for asphalt cement that includes an aggregate that is small and tightly packed such that it resists wear off, whereas a cement that is known to wear off quickly may require photocatalytic material to be embedded further into the concrete to account for additional wear. Other factors may include expected or average traffic or use patterns that may predict wear off rates, as well as weather information. Other factors that would be apparent to one of ordinary skill in the art are also likewise contemplated for use.

Thus, in some instances, it is required to calculate an amount of concrete treatment compound of the present technology, which will be required to penetrate the concrete surface down to a sufficient depth relative to an upper surface of the concrete surface. The examples of factors that affect wear off may be used as a part of this calculation. For example, if it is determined that based upon concrete composition and traffic pattern that an average wear off of 0.005 inches per year is expected, and the lifespan of the concrete surface is forty years, the concrete treatment compound should be applied so as to penetrate to a depth of up to one quarter of an inch, as the expected wear would be 0.2 (two tenths) inches over the forty years.

FIG. 1 is a flowchart of an exemplary method of treating concrete to reduce nitrogen oxides (NOx), volatile organic compounds (VOC), and other pollutants.

The method optionally includes preparing 105 the concrete, if necessary, to remove surface contaminants to ensure that the concrete treatment compound can adhere to and penetrate the concrete to the depth required.

In some embodiments, the method optionally includes texturing 110 the upper surface of the concrete. Again, this includes, for example, using an abrasive technique to prepare the surface of the concrete.

The method also comprises mixing 115 at least one solvent compound with a titanium dioxide (TiO$_2$) photocatalyst. In some instances, the TiO$_2$ photocatalyst is an anatase powder form of TiO$_2$. The solvent compound is mixed with the anatase TiO$_2$ so that the TiO$_2$ is dispersed, allowing the TiO$_2$ to penetrate the concrete pavement.

The method also comprises applying 120 an amount of concrete treatment compound to an upper surface of the concrete. As mentioned above, the concrete treatment compound comprises a mixture of a liquid carrier compound with the anatase titanium dioxide (TiO$_2$) photocatalyst. The liquid carrier compound may include any liquid that can seal and harden concrete and fills voids therein to increase resistance of the concrete to water damage, chloride ion penetration, de-icing salts, freeze/thaw damage, and other deleterious effects.

The method includes allowing 125 the treated concrete to dry for a period of time.

Figure 2:
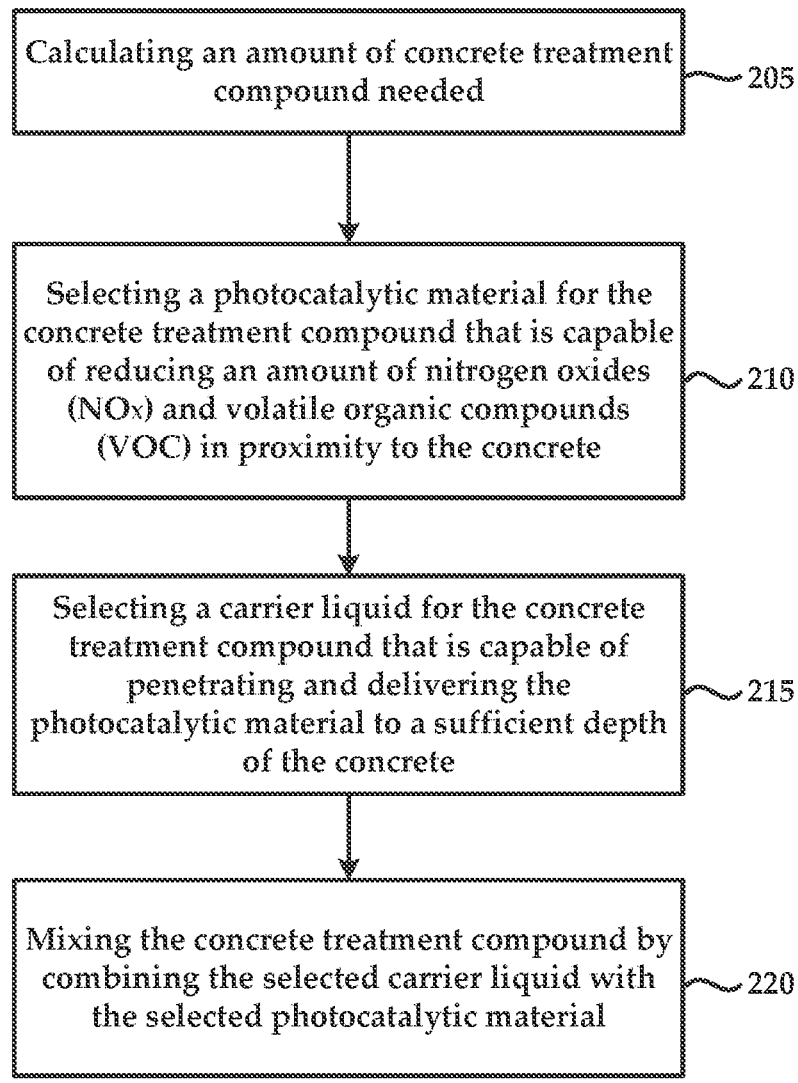
FIG. 2 is a method for preparing the concrete treatment compound that is to be applied to the concrete.

FIG. 2 is a method for preparing the concrete treatment compound that includes calculating 205 an amount of concrete treatment compound that is necessary to ensure that the concrete is penetrated and embedded with photocatalytic material to a sufficient depth.

The method also includes selecting 210 a photocatalytic material for the concrete treatment compound that is capable of reducing an amount of nitrogen oxides (NOx) and volatile organic compounds (VOC).

The method also includes selecting 215 a carrier liquid for the concrete treatment compound that is capable of penetrating and delivering the photocatalytic material to a sufficient depth of the concrete. In some embodiments, the method includes mixing 220 the concrete treatment compound by combining a liquid carrier compound with an amount of the selected photocatalytic material.

Figure 3:
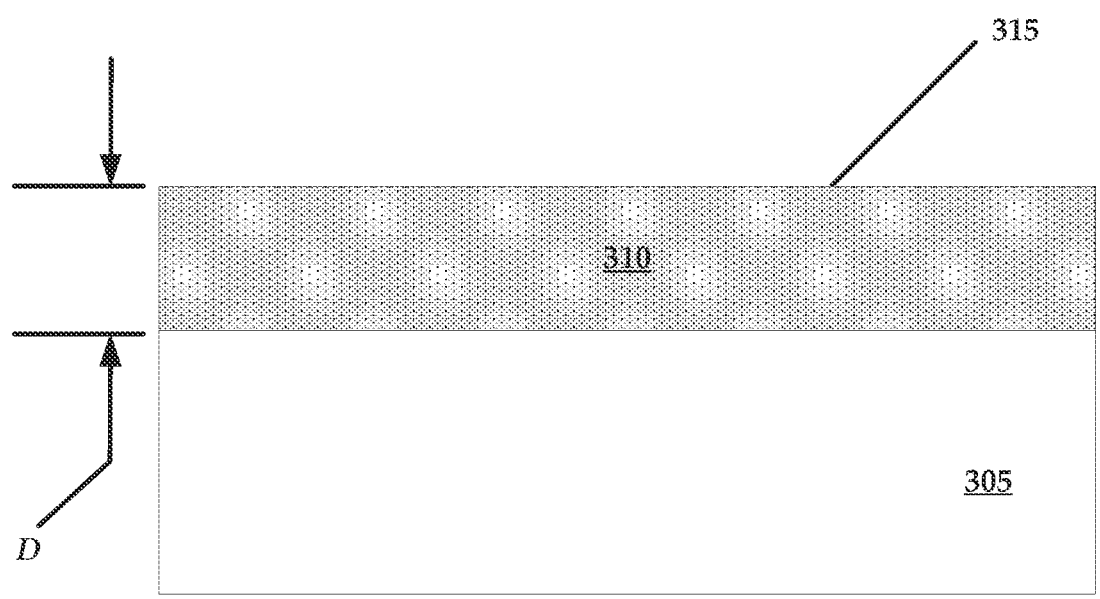
FIG. 3 is a cross sectional view of a treated section of concrete.

FIG. 3 illustrates an asphalt concrete section 305 that has been treated with concrete treatment compound 310. The concrete section 305 is shown as having an upper surface 315. The amount of concrete treatment compound 310 has penetrated down from the upper surface 315 to a depth D. This depth D can range anywhere from one sixteenth of an inch, to a half of an inch. Other depths may also be utilized and can vary according to design requirements and usage.

Other examples of compounds that may be used as carrier liquids include SurfCrete Ti manufactured by Pavement Technology, Inc., and RELAY Ti manufactured by Sinak Corporation. One embodiment of the present technology utilizes an anatase powder form of $TiO_2$ at concentrations of 3% to 5% by weight. The anatase powder form of $TiO_2$ is mixed with a solvent so that the $TiO_2$ is dispersed. Other resurfacing compounds and/or forms of $TiO_2$, and alternate concentration levels, can be employed as deemed suitable.

In some embodiments the compound is applied with squeegees to a concrete surface that has previously been roughened with abrasive media, such as the Skidabrader process, conventional shot blasting, diamond grinding, water blasting, and the like. For thicker applications, the compound is applied in layers, typically nine (9) mils thick, with each layer being allowed to dry before the next layer is applied.

While the present technology has been described in connection with a series of steps, these descriptions are not intended to limit the scope of the technology to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. The scope of the technology should, therefore, be determined not with reference to the above description, but instead should be determined with reference to the appended claims along with their full scope of equivalents.

What is claimed is:

1. A concrete structure, comprising:
    a concrete body having a surface, wherein the concrete body is composed of an aggregate and a binder that holds the aggregate together;
    a photocatalyst within the concrete body and concentrated near the surface;
    wherein the photocatalyst is distributed throughout a layer of the concrete body that is at the surface and is more than ⅛ inch thick;
    the photocatalyst is exposed at the surface so as to make the surface active for photocatalytic oxidation of volatile organic compounds that come in contact with the surface; and
    the photocatalyst is absent from an interface between the aggregate and the binder through which the binder holds the aggregate together.

2. The concrete structure of claim 1, wherein the photocatalyst is comprises anatase TiO2.

3. The concrete structure of claim 1, wherein the surface is a vertical surface.

4. The concrete structure of claim 1, wherein the surface is a horizontal surface.

5. The concrete structure of claim 1, wherein the photocatalyst has a coequal distribution with a concrete sealer in the concrete body.

6. The concrete structure of claim 1, wherein the photocatalyst is restricted to outer layers of the concrete body.

7. The concrete structure of claim 1, wherein any portion of the layer of the concrete body is photocatalytic if exposed by wear.

8. The concrete structure of claim 1, wherein the layer is at least ¼ inch thick.

9. The concrete structure of claim 8, wherein the photocatalyst is uniformly distributed throughout the layer.

10. The concrete structure of claim 1, wherein the layer is at least ½ inch thick.

11. The concrete structure of claim 1, wherein the photocatalyst exposed at the surface makes the surface active for photocatalytic oxidation of nitrogen oxides that come in contact with the surface.

12. The concrete structure of claim 1, wherein the photocatalyst exposed at the surface makes the surface operative to oxidize nitrogen oxides when the surface is exposed to sunlight and atmospheric humidity.

13. The concrete structure of claim 1, further comprising a concrete sealer, wherein the photocatalyst is distributed in the concrete body by the concrete sealer.

14. The concrete structure of claim 1, wherein:
    the photocatalyst is anatase TiO2 distributively embedded in the concrete body.

* * * * *